US012606007B2

(12) United States Patent
Ripa et al.

(10) Patent No.: US 12,606,007 B2
(45) Date of Patent: Apr. 21, 2026

(54) SYSTEM OF CONTROLLED FLAPS FOR A VEHICLE, COMPRISING TWO SETS OF FLAPS

(71) Applicant: Valeo Systemes Thermiques, Le Mesnil Saint-Denis (FR)

(72) Inventors: Jerome Ripa, Le Mesnil Saint Denis (FR); Enzo Mitidieri, Le Mesnil Saint Denis (FR); Pierre Alexandre Langlet, Le Mesnil Saint Denis (FR)

(73) Assignee: Valeo Systemes Thermiques, Le Mesnil Saint-Denis (FR)

( * ) Notice: Subject to any disclaimer, the term of this patent is extended or adjusted under 35 U.S.C. 154(b) by 271 days.

(21) Appl. No.: 17/783,519

(22) PCT Filed: Nov. 24, 2020

(86) PCT No.: PCT/FR2020/052162
§ 371 (c)(1),
(2) Date: Jun. 8, 2022

(87) PCT Pub. No.: WO2021/116553
PCT Pub. Date: Jun. 17, 2021

(65) Prior Publication Data
US 2023/0010282 A1     Jan. 12, 2023

(30) Foreign Application Priority Data

Dec. 9, 2019   (FR) ...................................... 1913958

(51) Int. Cl.
B60K 11/08 (2006.01)
B60R 19/52 (2006.01)
(Continued)

(52) U.S. Cl.
CPC ........... B60K 11/085 (2013.01); B60R 19/52 (2013.01); F01P 1/06 (2013.01); F01P 7/02 (2013.01)

(58) Field of Classification Search
CPC . B60K 11/085; B60R 19/52; B60R 201/9527; F01P 1/06; F01P 7/02; F01P 7/10; Y02T 10/88
(Continued)

(56) References Cited

U.S. PATENT DOCUMENTS

2007/0169725 A1* 7/2007 Harich ..................... F01P 11/10
123/41.05
2010/0243352 A1    9/2010 Watanabe et al.
(Continued)

FOREIGN PATENT DOCUMENTS

CN       103534122 A      1/2014
CN       105555574 A      5/2016
(Continued)

OTHER PUBLICATIONS

Search Report and Written Opinion issued in corresponding French Patent Application No. 1913958, dated Aug. 25, 2020 (7 pages).
(Continued)

*Primary Examiner* — Abby J Flynn
*Assistant Examiner* — Sean Patrick Reidy
(74) *Attorney, Agent, or Firm* — Osha Bergman Watanabe & Burton LLP

(57) ABSTRACT
The invention relates to a system (1) of controlled flaps comprising two sets (10a, 10b) of flaps (100), each set (10a, 10b) of flaps (100) being able to adopt an open position (p1) and a closed position (p2), characterized in that said system (1) of controlled flaps further comprises an actuator (11) that is configured to bring one (10a) of the sets (10a, 10b) of
(Continued)

flaps (100) into the open position (p1) before the other (10*b*) of the sets (10*a*, 10*b*) of flaps (100).

11 Claims, 13 Drawing Sheets

(51) Int. Cl.
    *F01P 1/06*          (2006.01)
    *F01P 7/02*          (2006.01)
(58) Field of Classification Search
    USPC ............................................................ 701/49
    See application file for complete search history.

(56) References Cited

U.S. PATENT DOCUMENTS

| | | | | |
|---|---|---|---|---|
| 2012/0074729 | A1* | 3/2012 | Fenchak | B60K 11/085 |
| | | | | 296/193.1 |
| 2014/0167451 | A1* | 6/2014 | Klop | B60K 11/085 |
| | | | | 403/113 |
| 2015/0183313 | A1* | 7/2015 | Bruckner | B60K 11/085 |
| | | | | 180/68.1 |
| 2016/0068059 | A1* | 3/2016 | Povinelli | B60K 11/06 |
| | | | | 180/68.1 |
| 2016/0361991 | A1 | 12/2016 | Phan et al. | |
| 2017/0297424 | A1* | 10/2017 | Ibañez Moreira ... | B60K 11/085 |
| 2018/0099558 | A1* | 4/2018 | Jeong | B60K 11/085 |
| 2018/0170170 | A1 | 6/2018 | Nam et al. | |
| 2018/0229598 | A1 | 8/2018 | Lambert | |

FOREIGN PATENT DOCUMENTS

| | | | |
|---|---|---|---|
| CN | 107303813 | A | 10/2017 |
| DE | 202011050523 | U1 | 10/2011 |
| DE | 102016015116 | A1 | 6/2018 |
| FR | 3069810 | A1 | 2/2019 |
| GB | 2515640 | A | 12/2014 |
| JP | 2015182496 | A | 10/2015 |

OTHER PUBLICATIONS

International Search Report and Written Opinion issued in corresponding International Patent Application No. PCT/FR2020/052162, mailed on Feb. 25, 2021 (12 pages).
Office Action issued in counterpart Chinese Patent Application No. 202080078156.5 mailed on Mar. 10, 2025 (15 pages).

* cited by examiner

[Fig. 1]
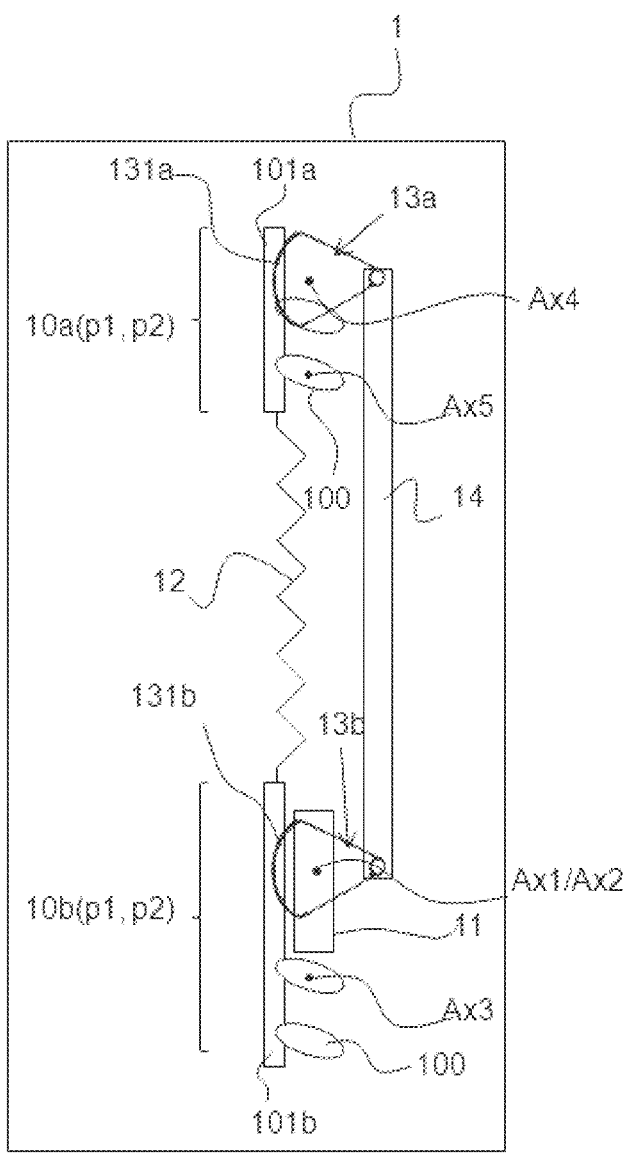

[Fig. 2a]
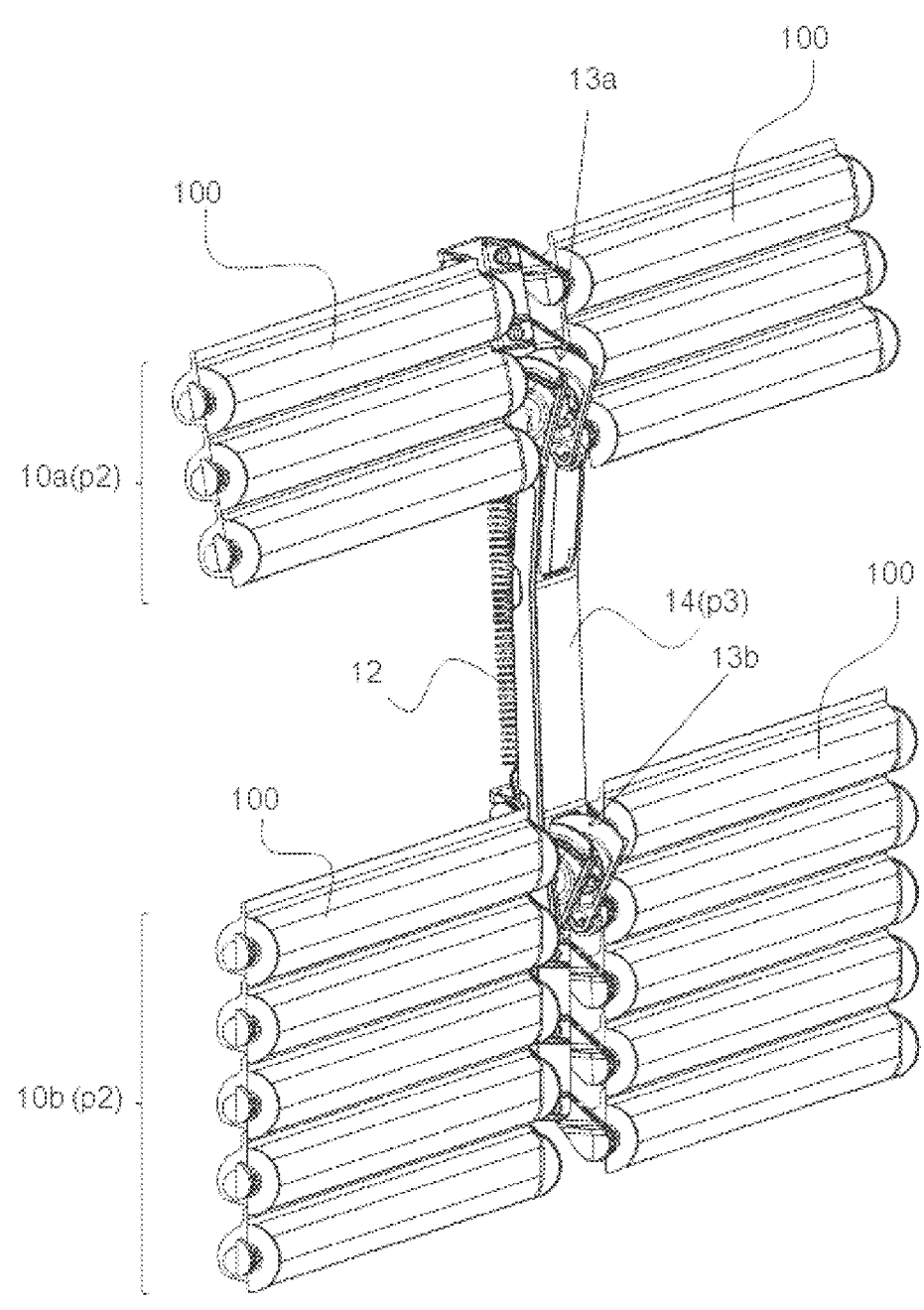

[Fig. 2b]
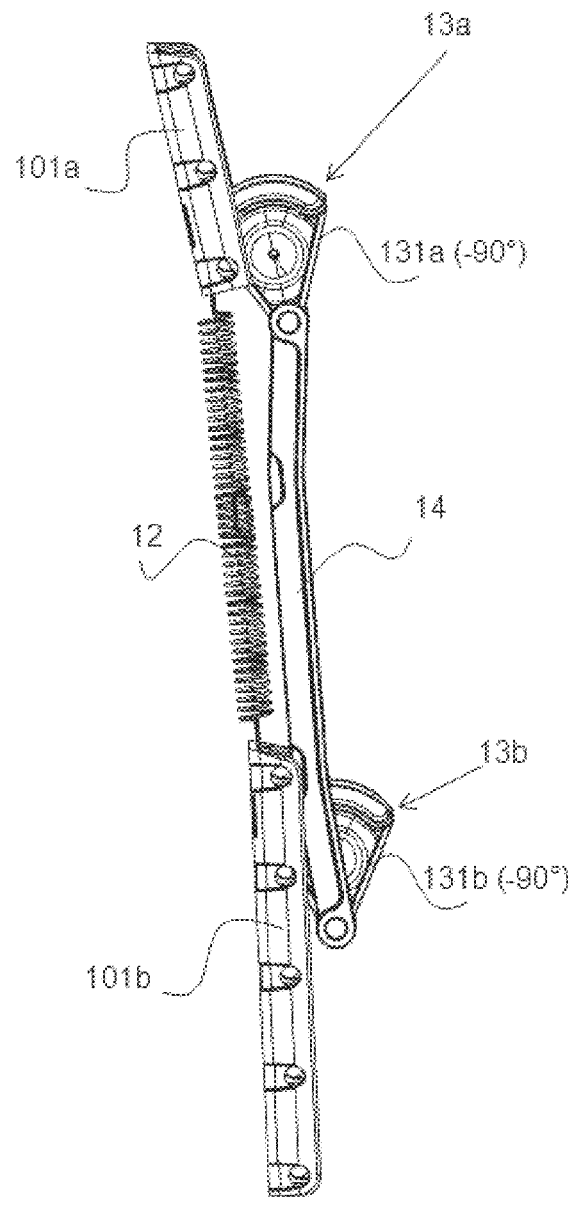

[Fig. 3a]
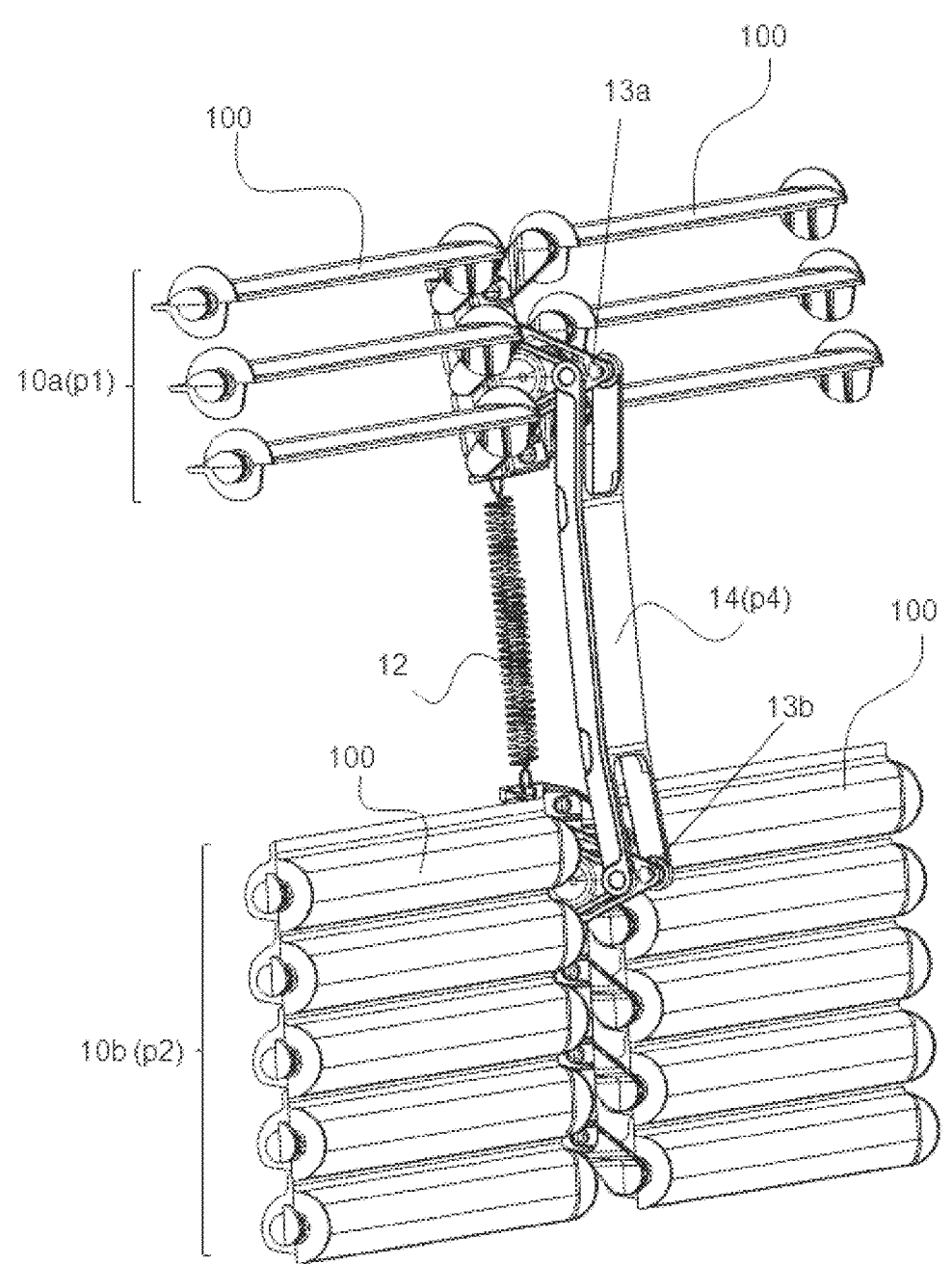

[Fig. 3b]
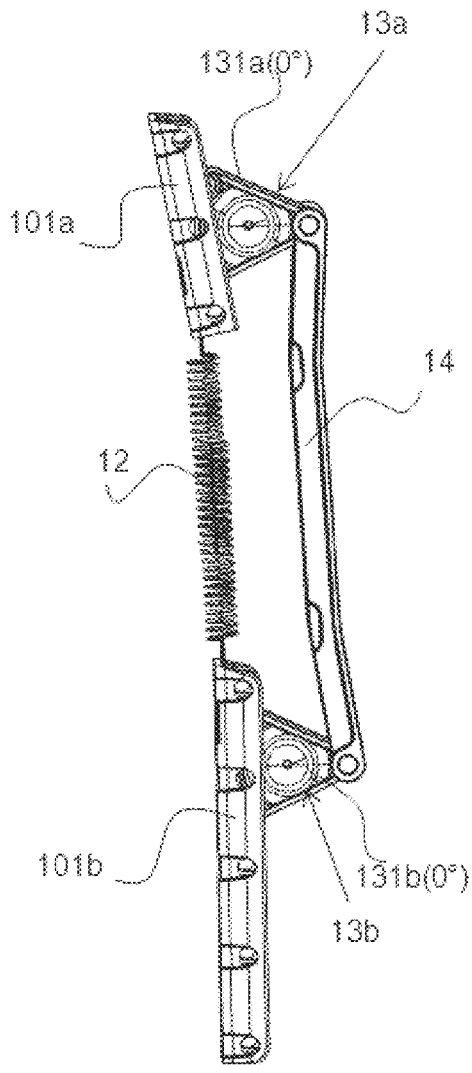

[Fig. 4a]
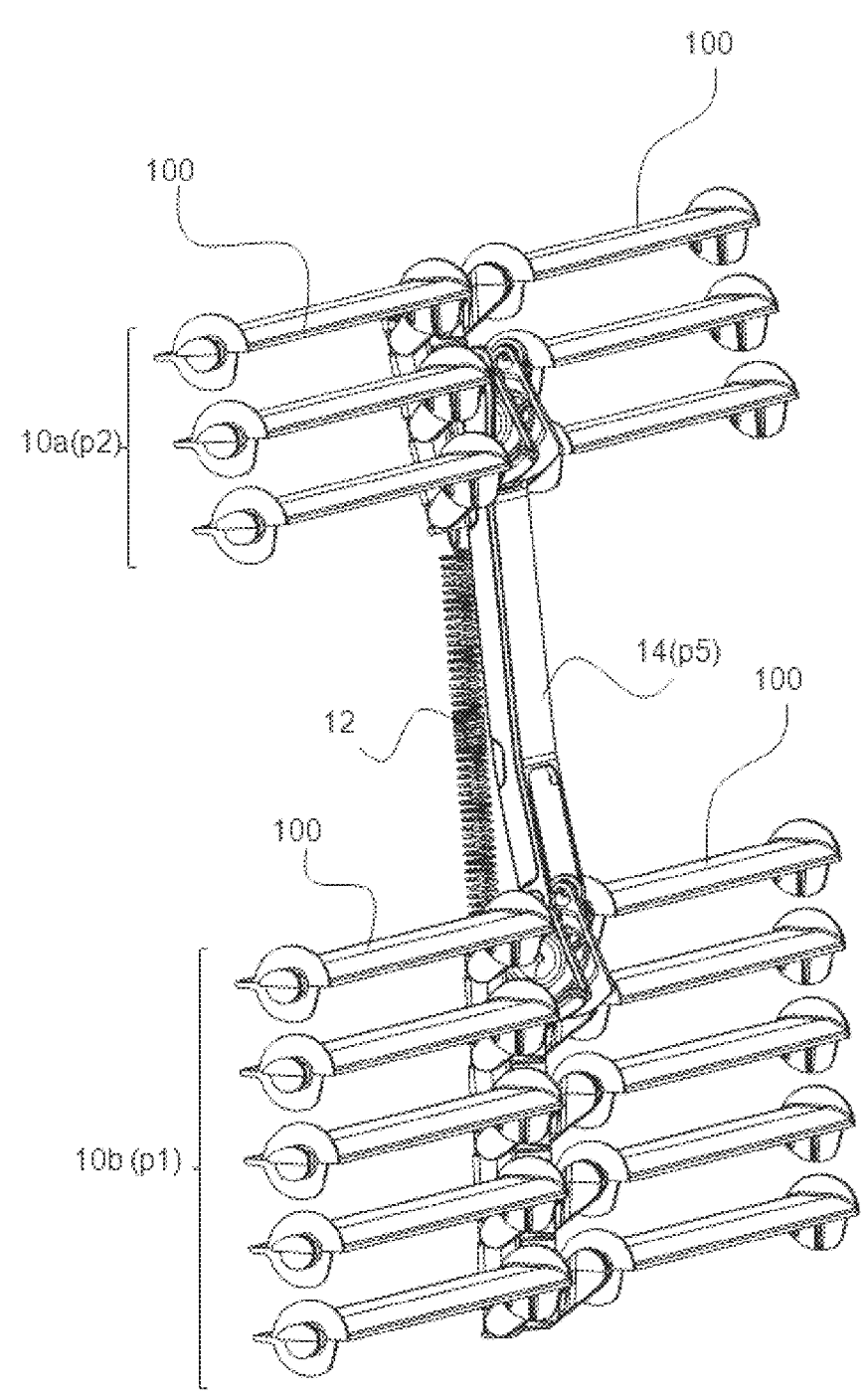

[Fig. 4b]
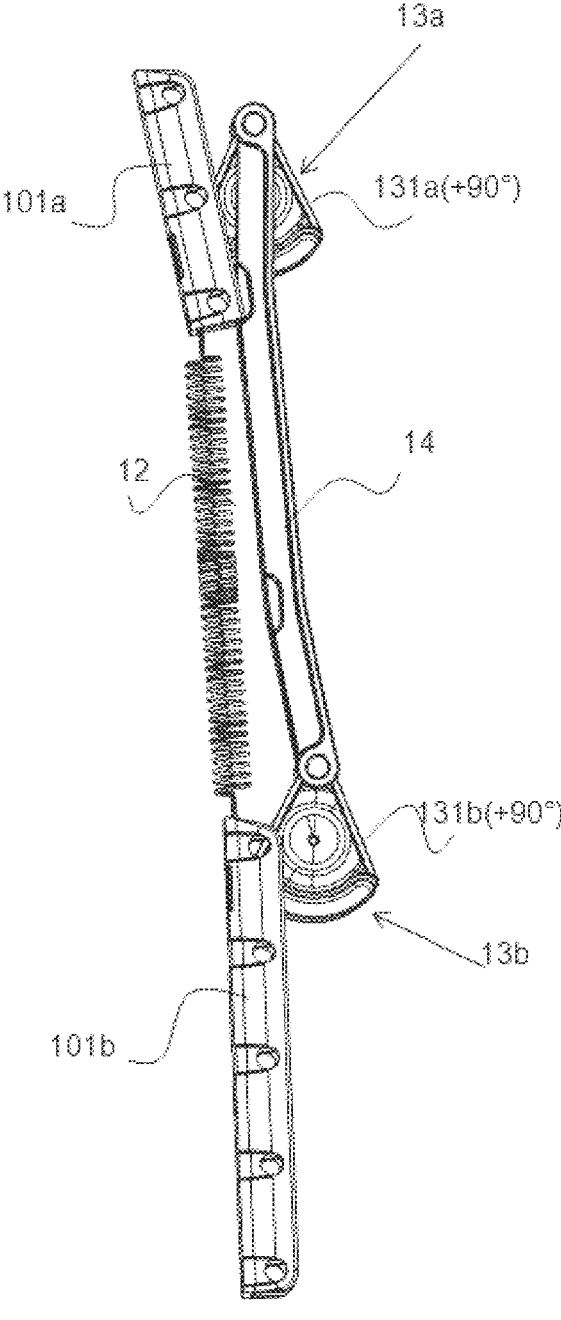

[Fig. 5a]
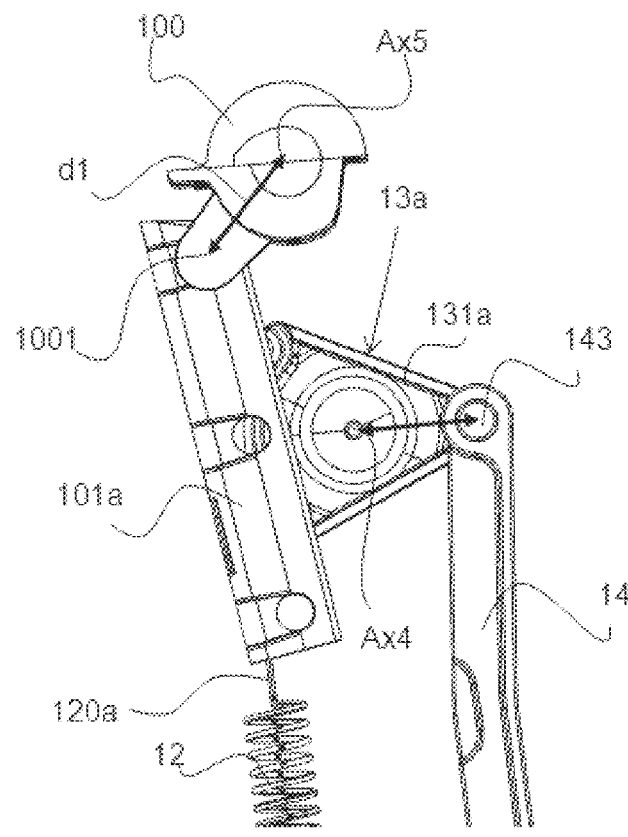

[Fig. 5b]
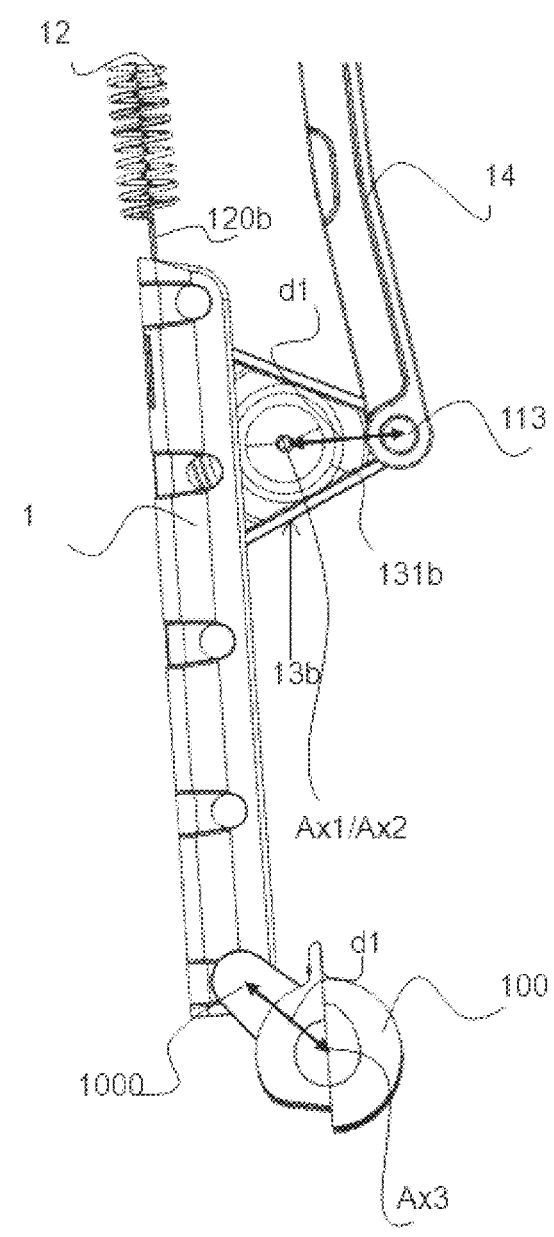

[Fig. 6a]
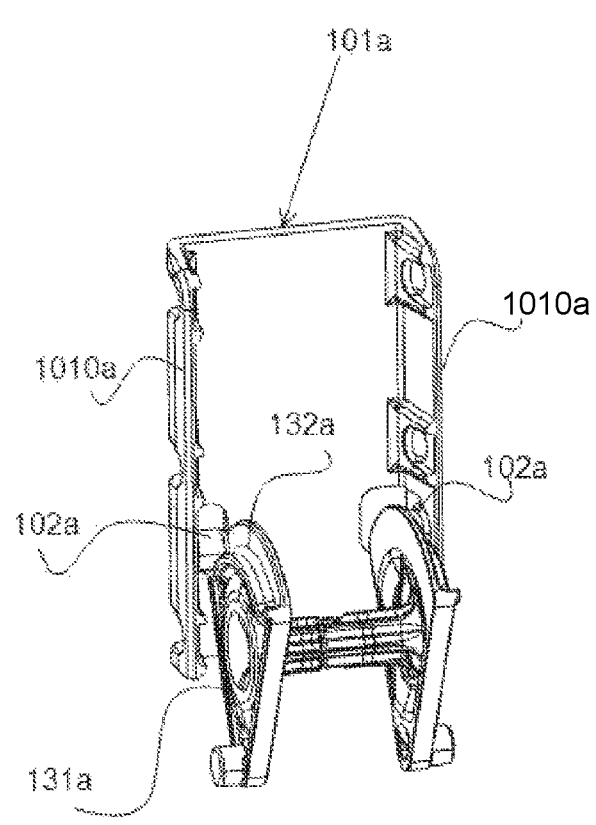

[Fig. 6b]
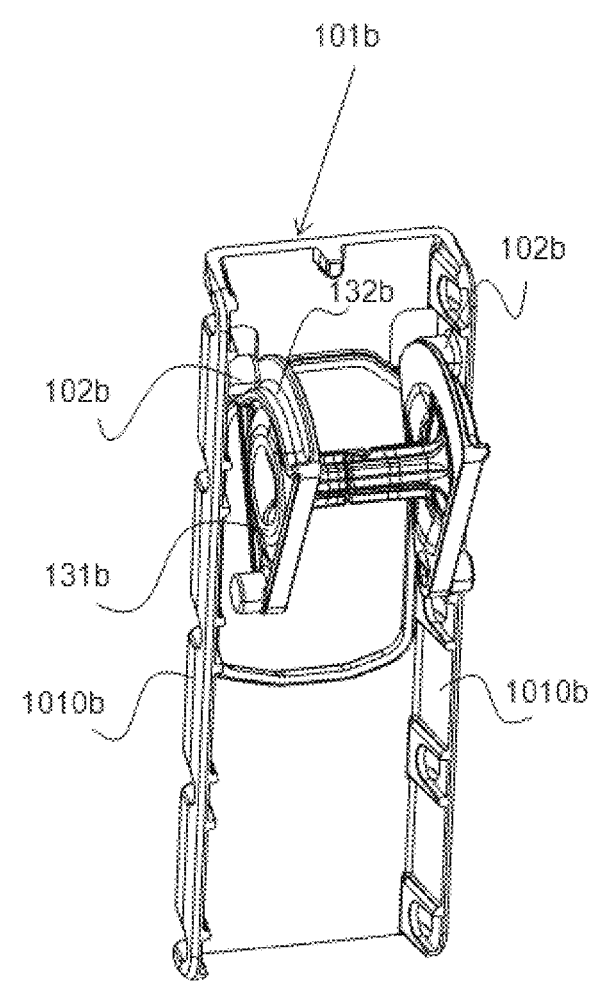

[Fig. 7]
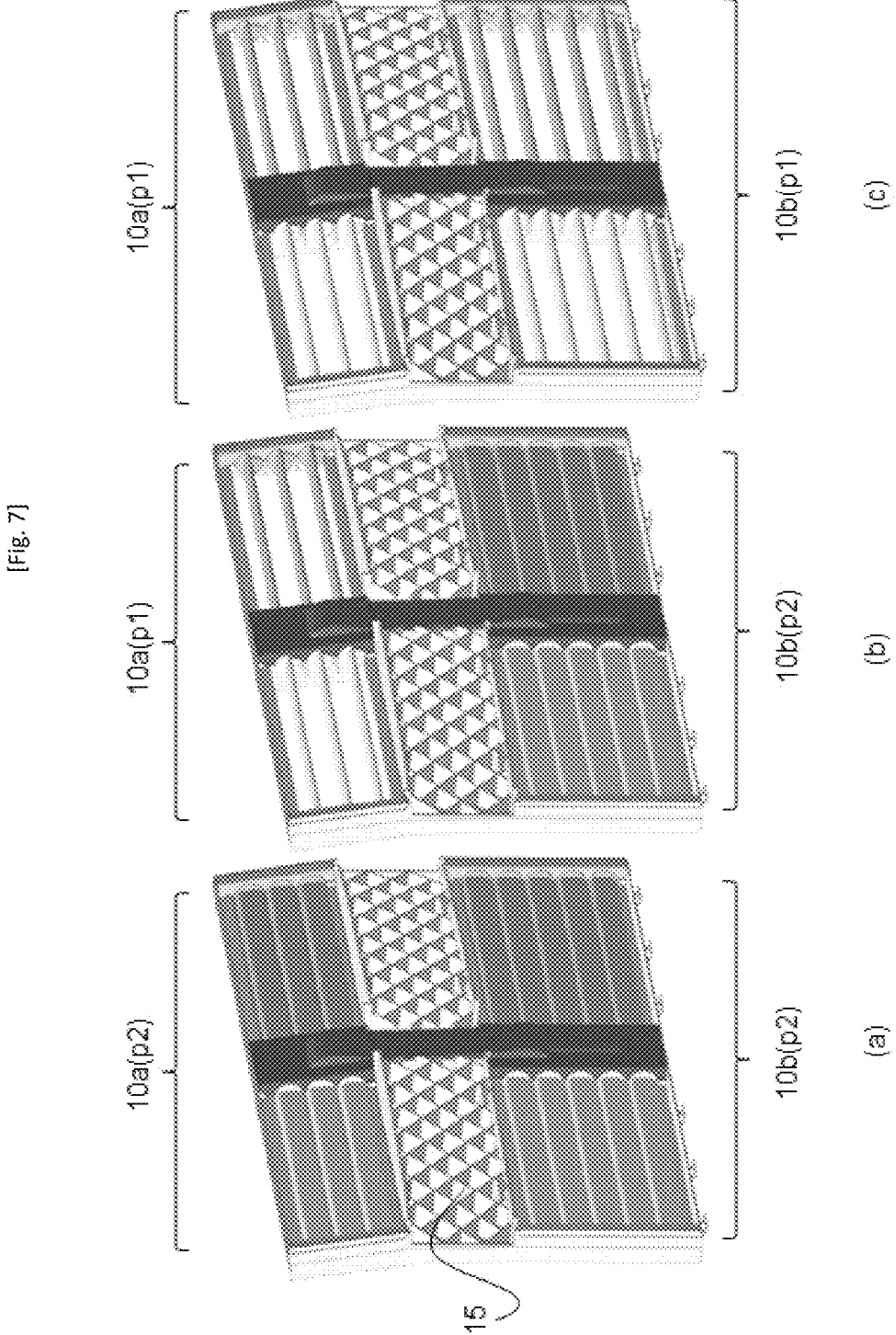

[Fig. 8]
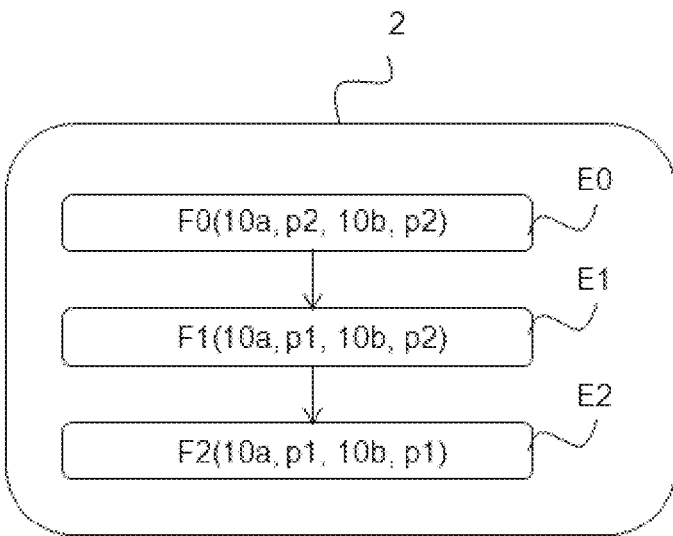
[Fig. 9]
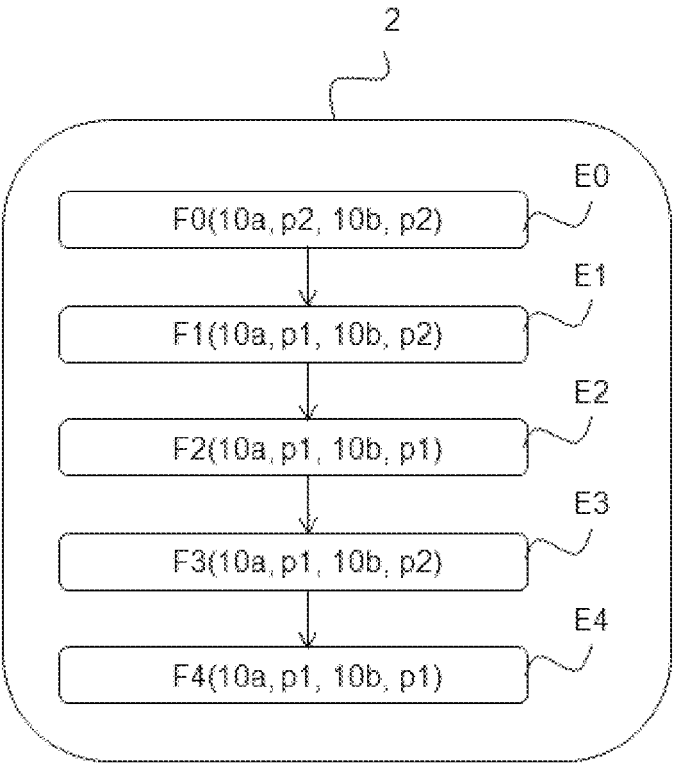

SYSTEM OF CONTROLLED FLAPS FOR A VEHICLE, COMPRISING TWO SETS OF FLAPS

The present invention relates to a system of controlled flaps for a vehicle. It is particularly applicable, but not limited, to motor vehicles. It also relates to a method for controlling flaps that is implemented by said system of controlled flaps.

In the field of motor vehicles, a system of controlled flaps for a vehicle, known to those skilled in the art, is arranged behind the grille of motor vehicles, and comprises two sets of flaps which can assume an open position and a closed position, the two sets of flaps being opened or closed simultaneously to allow air to pass or to prevent the passage of air under the engine hood of motor vehicles.

A drawback of that prior art is that one of the sets of flaps cannot be opened or closed independently of the other of the sets of flaps.

In this context, the present invention aims to propose a system of controlled flaps for a vehicle that makes it possible to solve the drawback mentioned.

To this end, the invention proposes a system of controlled flaps for a vehicle, comprising two sets of flaps, each set of flaps being able to assume an open position and a closed position, characterized in that said system of controlled flaps further comprises an actuator configured to drive one of the sets of flaps into the open position before the other of the sets of flaps.

According to nonlimiting embodiments, the system of controlled flaps for a vehicle can also comprise one or more additional characteristics taken alone or according to all the technically possible combinations, among the following.

According to one nonlimiting embodiment, said system of controlled flaps further comprises:

- a spring connecting the two sets of flaps,
- an upper lever with a primary lost motion cam configured to be driven by a connecting rod,
- a lower lever with a secondary lost motion cam configured to be driven by said actuator, and
- said connecting rod connected to said actuator and connecting said upper lever and said lower lever.

According to one nonlimiting embodiment, said spring is configured to:

- be tensioned when the two sets of flaps are in the closed position,
- relax so as to position one of the sets of flaps in the open position,
- be tensioned when the two sets of flaps are in the open position.

According to one nonlimiting embodiment, the two sets of flaps are initially in the closed position.

According to one nonlimiting embodiment, one of the sets of flaps extends in a different plane from the other of the sets of flaps or the two sets of flaps are coplanar.

According to one nonlimiting embodiment, said system of controlled flaps further comprises:

- a primary connecting part connecting the flaps of one of the sets of flaps and comprising at least one primary drive finger which comes into abutment in the primary lost motion cam when one of the sets of flaps is in the open position or in the closed position,
- a secondary connecting part connecting the flaps of the other of the sets of flaps and comprising at least one secondary drive finger which comes into abutment in the secondary lost motion cam when the other of the sets of flaps is in the open position or in the closed position, and which slides along said secondary lost motion cam when one of the sets is in the open position.

There is also proposed a method for controlling flaps of a vehicle, said flaps forming part of two sets of flaps, each set of flaps being able to assume an open position and a closed position, characterized in that said control method comprises a step of driving one of the sets of flaps into the open position before the other of the sets of flaps.

According to one nonlimiting embodiment, the two sets of flaps are initially in the closed position.

According to one nonlimiting embodiment, to drive the two sets of flaps into the open position, said control method executes the step of driving one of the sets of flaps into the open position before the other of the sets of flaps.

According to one nonlimiting embodiment, to drive the two sets of flaps into the closed position, said control method executes the step of driving the other of the sets of flaps into the closed position before one of the sets of flaps.

The invention and its various applications will be better understood upon reading the following description and with reference to the accompanying figures, in which:

FIG. 1 schematically illustrates a system of controlled flaps for a vehicle, comprising two sets of flaps, an actuator, a spring, an upper lever with a lost motion cam, a lower lever with a lost motion cam, and a connecting rod, according to one nonlimiting embodiment of the invention, FIG. 2a illustrates a perspective view of the two sets of flaps, the spring, the upper lever with a lost motion cam, the lower lever with a lost motion cam, and the connecting part of the system of controlled flaps of FIG. 1, when the two sets of flaps are in a closed position, according to one nonlimiting embodiment, FIG. 2b illustrates a side view of the elements of FIG. 2a, without the two sets of flaps, according to one nonlimiting embodiment, FIG. 3a illustrates a perspective view of the two sets of flaps, the spring, the upper lever with a lost motion cam, the lower lever with a lost motion cam, and the connecting part of the system of controlled flaps of FIG. 1, when one of the sets of flaps is in an open position and the other of the sets of flaps is in a closed position, according to one nonlimiting embodiment, FIG. 3b illustrates a side view of the elements of FIG. 3a, without the two sets of flaps, according to one nonlimiting embodiment, FIG. 4a illustrates a perspective view of the two sets of flaps, the spring, the upper lever, the lower lever, and the connecting part of the system of controlled flaps of FIG. 1, when the two sets of flaps are in an open position, according to one nonlimiting embodiment, FIG. 4b illustrates a side view of the elements of FIG. 4a, without the two sets of flaps, according to one nonlimiting embodiment, FIG. 5a illustrates a zoomed view of one of the sets of flaps, the upper lever, and the connecting rod with their axes of rotation of FIG. 3a, according to one nonlimiting embodiment, FIG. 5b illustrates a zoomed view of the other of the sets of flaps, the lower lever, and the connecting rod with their axes of rotation of FIG. 3a, according to one nonlimiting embodiment, FIG. 6a illustrates a zoomed view of a primary connecting part which connects the flaps of one of the sets of flaps and which cooperates with the upper lever of FIG. 1, according to one nonlimiting embodiment, FIG. 6b illustrates a zoomed view of a secondary connecting part which connects the flaps of the other of the sets of flaps and which cooperates with the lower lever of FIG. 1, according to one nonlimiting embodiment, FIG. 7 illustrates an opening sequence of the two sets of flaps of the system of controlled flaps of FIG. 1, according to one nonlimiting embodiment, and FIG. 8 illustrates a diagram of a method for controlling flaps that is implemented by the system of controlled flaps of FIG. 1, according to one nonlimiting embodiment of the invention, FIG. 9 illustrates a diagram of the method for controlling flaps of FIG. 8 with additional steps, according to one nonlimiting embodiment.

Elements that are identical, in structure or in function, and that appear in different figures keep the same reference signs, unless specified otherwise.

The invention relates to a system 1 of controlled flaps for a vehicle. It is described with reference to FIGS. 1 to 7. The invention also relates to a method 2 for controlling flaps 100 of a vehicle that is implemented by said system 1 of controlled flaps. It is described with reference to FIGS. 8 and 9. In one nonlimiting embodiment, the vehicle is a motor vehicle. The term motor vehicle is understood to mean any type of motorized vehicle. This embodiment is taken as a nonlimiting example throughout the remainder of the description. Throughout the remainder of the description, the vehicle is thus also called a motor vehicle.

The system 1 of controlled flaps, also known as air grille shutters, is arranged behind the grille of the motor vehicle. It is connected to one or more air exchangers. The system 1 of controlled flaps allows air coming from outside the motor vehicle to pass under the engine hood or to prevent the passage of air under the engine hood of the motor vehicle.

As illustrated in FIG. 1, in one nonlimiting embodiment, the system 1 of controlled flaps comprises:

two sets 10a, 10b of flaps 100, an actuator 11, a spring 12, an upper lever 13a with a primary lost motion cam 131a, otherwise called upper lever 13a or primary lever 13a, a lower lever 13b with a secondary lost motion cam 131b, otherwise called lower lever 13b or secondary lever 13b, a connecting rod 14.

It will be noted that for reasons of clarity, only a few flaps 100 have been illustrated in the diagram of FIG. 1. In the remainder of the description, the sets 10a, 10b of flaps 100 will equally be referred to as sets 10a, 10b. The two sets 10a, 10b of flaps 100 can assume an open position p1 or a closed position p2. They are separated by a shock-absorbing cross-piece 15 as illustrated in FIG. 7. There is thus a set 10a of flaps 100, otherwise called the first set 10a or the upper route 10a; and a set 10b of flaps, otherwise called the second set 10b or the lower route 10b. Each set 10a, 10b comprises one or more flaps 100 and the same number or a different number of flaps 100. In the nonlimiting example of FIG. 7, the set 10a and the set 10b have a different number of flaps 100.

The flaps 100 of the set 10a are interconnected by a primary connecting part 101a (illustrated in FIGS. 2b, 3b, 4b, 6a and 6b). The flaps 100 of the set 10b are interconnected by a secondary connecting part 101b (illustrated in FIGS. 2b, 3b, 4b, 6a and 6b).

In one nonlimiting embodiment, each set 10a, 10b of flaps 100 comprises two sets of flaps 100, one right and one left. In this case, in one nonlimiting embodiment illustrated in FIG. 6a, the primary connecting part 101a comprises two sides 1010a allowing each set of flaps 100 to be respectively fastened. Similarly, in one nonlimiting embodiment illustrated in FIG. 6b, the secondary connecting part 101b comprises two sides 1010b allowing each set of flaps 100 to be respectively fastened.

The two sets 10a, 10b are initially in the closed position p2 as illustrated in FIG. 7. Initially means when the motor vehicle is started. In one nonlimiting embodiment, one 10a of the sets 10a, 10b extends in a different plane from the other 10b of the sets 10a, 10b. In another nonlimiting embodiment, the two sets 10a, 10b extend in the same plane. They are thus coplanar. In a nonlimiting alternative embodiment, the two sets 10a, 10b extend in the same inclined plane, or the two sets 10a, 10b can also extend in planes parallel to each other, or even in two distinct nonparallel planes.

In one nonlimiting embodiment illustrated in FIGS. 6a and 6b, one 10a of the sets 10a, 10b comprises at least one primary drive finger 102a which is configured to come into abutment in the primary lost motion cam 131a of the upper lever 13a when one 10a of the sets 10a, 10b is in the open position p1 or in the closed position p2. In particular, it is the primary connecting part 101a which comprises this primary drive finger 102a. In the nonlimiting example illustrated, it comprises two primary drive fingers 102a arranged on each side 1010a of the primary connecting part 101a. In one nonlimiting embodiment, these two primary drive fingers 102a face inward. The lost motion portion 132a (illustrated in FIG. 6a) of the primary lost motion cam 131a can move along the primary drive finger 102a.

In one nonlimiting embodiment illustrated in FIG. 6b, the other 10b of the sets 10a, 10b comprises at least one secondary drive finger 102b which is configured to come into abutment in the secondary lost motion cam 131b of the secondary lever 13b when the other 10b of the sets 10a, 10b is in the open position p1 or in the closed position p2. In particular, it is the secondary connecting part 101b which comprises this secondary drive finger 102b. In the nonlimiting example illustrated, it comprises two secondary drive fingers 102b arranged on each side 1010b of the primary connecting part 101b. In one nonlimiting embodiment, these two secondary drive fingers 102b face inward.

Furthermore, the secondary drive finger 102b slides in said secondary lost motion cam 131b when one 10a of the sets 10a, 10b is in the open position p1. The lost motion portion 132b (illustrated in FIG. 6b) of the secondary lost motion cam 131b moves along the secondary drive finger 102b.

The actuator 11 is configured to drive one 10a of the sets 10a, 10b of flaps 100 into the open position p1 before the other 10b of the sets 10a, 10b of flaps 100. There is thus a sequenced opening of the flaps 100. Thus, it opens the flaps of one of the sets 10a, 10b before the other 10b of the sets 10a, 10b. The actuator 11 can thus drive the two sets 10a, 10b of flaps 100 independently of each other. Thus, it is possible to have a modular flap control strategy (opening/closing), this being achieved by means of a single actuator 11. In the nonlimiting embodiment where each set 10a, 10b comprises two sets of flaps (right and left) and where the primary connecting part 101a comprises two sides 1010a and the secondary connecting part 101b comprises two sides 1010b, in one nonlimiting embodiment, the actuator 11 is a double-outlet actuator in order to balance the forces on the primary connecting part 101a and the secondary connecting part 101b. The simultaneous action of the force on each side 1010a of the primary connecting part 101a provides it with linear movement. It is the same with the secondary connecting part 101b. This makes it possible to limit as far as possible unwanted forces due to the offset of the primary connecting part 101a by the action of a single upper lever 13a. This makes it possible to limit as far as possible unwanted forces due to the offset of the secondary connecting part 101b by the action of a single lower lever 13b. It is advantageous to have a double-outlet actuator 11 especially in this type of kinematics where:

the guiding of the primary drive fingers 102a in the primary lost motion portions 131a of the upper lever 13a depends on the correct alignment of the set, namely the alignment of the two primary drive fingers 102a with each other when they cooperate with the primary lost motion portions 131a, the guiding of the secondary drive fingers 102b in the secondary lost motion portions 131b of the lower lever 13b depends on the correct alignment of the set, namely the alignment of the two secondary drive fingers 102b with each other when they cooperate with the secondary lost motion portions 131b.

Since such a double-outlet actuator is known to those skilled in the art, it is not described in more detail here.

The flap control strategy can comprise:

the opening of all the flaps 100 of the two sets 10a, 10b, the closing of all the flaps 100 of the two sets 10a, 10b, the opening of the flaps of one 10a of the sets 10a, 10b and the closing of the flaps 100 of the other 10b of the sets 10a, 10b, the closing of the flaps of one 10a of the sets 10a, 10b and the opening of the flaps of the other 10b of the sets 10a, 10b.

In a nonlimiting exemplary embodiment, the flaps 100 of the two sets 10a, 10b of flaps 100 are opened during a heating phase of the combustion engine. This can happen when the motor vehicle is traveling slowly and on a hill. At this moment, there is in fact little air arriving under the engine hood and air is made to enter to cool the engine.

In one nonlimiting exemplary embodiment, the flaps of the two sets 10a, 10b of flaps 100 are closed:

when it is desired to improve the air penetration of the motor vehicle. This avoids creating turbulence under the engine hood by preventing air from entering under the engine hood. This results in a gain in speed, and a reduction in fuel consumption and therefore CO2 emissions.

during very cold periods, so that the air which is already under the engine hood is in a closed circuit and heats the engine so as to facilitate rapid starting of the motor vehicle, and thus reduce fuel consumption, when the motor vehicle is stationary for a few hours to prevent the engine from cooling down and thus to facilitate starting of the motor vehicle thereafter.

The actuator 11 is connected to the lower lever 13b. It is configured to drive said lower lever 13b. The actuator 11 is set in movement by a motor (not illustrated). An electronic control unit (not illustrated) makes it possible to send control signals to said actuator 11 to set it in movement, according to the defined flap control strategy.

As illustrated in FIG. 1, in one nonlimiting embodiment, the axis of rotation Ax1 of the actuator 11 is the same as the axis of rotation Ax2 of the lower lever 13b. Moreover, as illustrated in FIG. 5a, the axis of rotation Ax2 of the lower lever 13b is located on the same plane as the axis of rotation Ax3 of each flap 100 of the set 10b. This makes it possible to have good kinematics. For the sake of clarity, FIG. 5b illustrates only one flap 100.

As illustrated in FIG. 5b, the axis of rotation Ax2 of the lower lever 13b is separated by a distance d1 from the bearing point 113 of the actuator 11 on the lower lever 13b.

As illustrated in FIG. 5b, the axis of rotation Ax3 of each flap 100 of the set 10b has the same distance d1 with a point of fastening 1000 of each flap 100 on the secondary connecting part 101b. In one nonlimiting embodiment, the distance d1 is greater than or equal to 17 mm. It should be noted that below this value, feasibility problems could arise. Thus, the secondary lost motion cam 131b of the lower lever 13b performs an identical movement in distance as the secondary connecting part 101b.

The spring 12 connects the two sets 10a, 10b of flaps 100. It is thus fastened to one 10a of the sets 10a, 10b, and to the other of the sets 10a, 10b respectively via the primary connecting part 101a which connects the flaps 100 of one 10a of the sets 10a, 10b, and the secondary connecting part 101b which connects the flaps 100 of the other 10b of the sets 10a, 10b. Thus, one of its ends 120a (illustrated in FIG. 5a) is fastened to the primary connecting part 101a, and the other (illustrated in FIG. 5a) of its ends 120b (illustrated in FIG. 5b) is fastened to the secondary connecting part 101b.

As illustrated in FIGS. 2a and 2b, the spring 12 is configured to be tensioned from above when the two sets 10a, 10b of flaps 100 are in the closed position p2. FIG. 7 illustrates the flaps 100 of the upper route 10a closed and the flaps 100 of the lower route 10b closed (phase a).

As illustrated in FIGS. 3a and 3b, the spring 12 is configured to relax (position at rest) so as to position one 10a of the sets of flaps 100 in the open position p1 while the other 10b of the sets of flaps 100 is held in the closed position p2. FIG. 7 illustrates the flaps 100 of the upper route 10a open and the flaps 100 of the lower route 10b closed (phase b).

As illustrated in FIGS. 4a and 4b, the spring 12 is configured to be tensioned from below when the two sets 10a, 10b of flaps 100 are in the open position p1. FIG. 7 illustrates the flaps 100 of the upper route 10a open and the flaps 100 of the lower route 10b open (phase c).

As illustrated in FIGS. 2a to 4b, the upper lever 13a and the lower lever 13b are connected by the connecting rod 14. The upper lever 13a is thus configured to be driven by the connecting rod 14. The lower lever 13b is configured to be driven by the actuator 11 because it is connected to said actuator 11 and therefore it is configured to push the connecting rod 14.

As illustrated in FIG. 5a, in one nonlimiting embodiment, the axis of rotation Ax4 of the upper lever 13a is located in the same plane as the axis of rotation Ax5 of each flap 100 of the set 10a. This makes it possible to have good kinematics. For the sake of clarity, FIG. 5b illustrates only one flap 100. The axis of rotation Ax1 of the lower lever 13b is located in the same plane as the axis of rotation Ax4 of the upper lever 13a.

As illustrated in FIG. 5a, the axis of rotation Ax4 of the upper lever 13a is a distance d1 from the bearing point 143 of the connecting rod 14 on the upper lever 13a. As illustrated in FIG. 5a, the axis of rotation Ax5 of each flap 100 of the set 10a has the same distance d1 with a point of fastening 1001 of each flap 100 on the primary connecting part 101a. In one nonlimiting embodiment, the distance d1 is less than 30 mm (millimeters). Thus, the primary lost motion cam 131a of the upper lever 13a performs an identical displacement in distance as the primary connecting part 101a.

The primary lost motion cam 131a of the upper lever 13a is configured to cooperate with at least one primary drive finger 102a of the primary connecting part 101a. In the nonlimiting example illustrated in FIG. 6a, it cooperates with two primary drive fingers 102a. In this case, it is a double lost motion cam. The secondary lost motion cam 131b of the lower lever 13b is configured to cooperate with at least one secondary drive finger 102b of the secondary connecting part 101b. In the nonlimiting example illustrated in FIG. 6a, it cooperates with two secondary drive fingers 102b. In this case, it is a double lost motion cam.

In one nonlimiting embodiment, the primary lost motion cam 131a can assume positions between −90° and +90°. The −90° position (illustrated in FIG. 2b) corresponds to all the flaps 100 of the set 10a being closed (illustrated in FIG. 2a). The 0° position (illustrated in FIG. 3b) corresponds to all the flaps 100 of the set 10a being open (illustrated in FIG. 3a). The +90° position (illustrated in FIG. 4b) corresponds to all the flaps 100 of the set 10a being open (illustrated in FIG. 4a).

In one nonlimiting embodiment, the secondary lost motion cam 131b can assume positions between −90° and +90°. The −90° position (illustrated in FIG. 2b) corresponds to all the flaps 100 of the set 10b being closed (illustrated in FIG. 2a). The 0° position (illustrated in FIG. 3b) corresponds to all the flaps 100 of the set 10b being closed (illustrated in FIG. 3a). The +90° position (illustrated in FIG. 4b) corresponds to all the flaps 100 of the set 10b being open (illustrated in FIG. 4a).

Thus, as illustrated in FIGS. 2a and 2b, when the upper route 10a and the lower route 10b are in the closed position p2, the primary lost motion cam 131a is in a −90° position and the secondary lost motion cam 131b is also in a −90° position.

Thus, as illustrated in FIGS. 3a and 3b, when the upper route 10a is in the open position p1 and the lower route 10b is in the closed position p2, the primary lost motion cam 131a is in a 0° position and the secondary lost motion cam 131b is also in a 0° position.

Thus, as illustrated in FIGS. 4a and 4b, when the upper route 10a and the lower route 10b are in the open position p1, the primary lost motion cam 131a is in a +90° position and the secondary lost motion cam 131b is also at +90°.

Thus, to pass from the closed position p2 where all the flaps 100 are closed to the open position p1 where all the flaps 100 are open, the primary lost motion cam 131a and the secondary lost motion cam 131b will have performed a rotation of +180°.

Positions other than −90°, 0° and +90° can be assumed. Thus, in another nonlimiting example, the primary lost motion cam 131a is in a −45° position and the secondary lost motion cam 131b is also in a −45° position. In this case, the flaps 100 of the upper route 10a are half-open, while the flaps 100 of the lower route 10b remain closed. Thus, in another nonlimiting example, the primary lost motion cam 131a is in a +45° position and the secondary lost motion cam 131b is also in a +45° position. In this case, the flaps 100 of the lower route 10b are half-open, while the flaps 100 of the upper route 10a are already completely open. It will be noted that the flaps 100 of the upper route 10a and of the lower route 10b cannot be half-open at the same time.

It will be noted that when the primary lost motion cam 131a and the secondary lost motion cam 131b are between an angle of −90° to 0°, the upper route 10a is influenced while the lower route 10b remains in the closed position p2. Whereas when the primary lost motion cam 131a and the secondary lost motion cam 131b are between an angle of 0° to +90°, the lower route 10b is influenced while the upper route 10a remains in the open position p1. A set 10a, 10b of flaps 100 is thus operated independently of one another.

Thus, depending on the control strategy of the flaps 100, it is possible to more or less open the flaps 100 of the set 10a and/or of the set 10b in order to allow more or less air to pass under the engine hood.

The connecting rod 14 which connects the upper lever 13a and the lower lever 13b is configured to drive the upper lever 13a, namely it is configured to rotate the upper lever 13a.

As illustrated in FIG. 2a, when the upper route 10a and the lower route 10b are in the closed position p2, the connecting rod 14 is close to the spring 12 and is in a so-called bottom position p3.

As illustrated in FIG. 3a, when the upper route 10a is in the open position p1 and the lower route 10b is in the closed position p2, the connecting rod 14 is farther from the spring 12, and is in a so-called intermediate position p4.

As illustrated in FIG. 4a, when the upper route 10a and the lower route 10b are in the open position p1, the connecting rod 14 is again close to the spring 12 and is in a so-called top position p5.

The system 1 of controlled flaps for a vehicle thus described is configured to implement a method 2 for controlling flaps 100 (otherwise called control method 2), said flaps 100 forming part of two sets 10a, 10b of flaps 100. The control method 2 is described below with reference to FIGS. 8 and 9. The control is performed by the actuator 11.

The sequence illustrated in FIG. 7 is taken as a nonlimiting example. As illustrated in FIG. 7, the flaps 100 of the upper route 10a and the lower route 10b are initially closed p2 (phase (a)). The upper route 10a and the lower route 10b are in the closed position p2. The flaps 100 of the upper route 10a will be opened before those of the lower route 10b (phase (b)). Then, the flaps 100 of the lower route 10b will be opened (phase (c)). In the end, the flaps 100 of the upper route 10a and of the lower route 10b will all be open. The upper route 10a and the lower route 10b will be in the open position p1.

The control method 2 comprises the following steps according to one nonlimiting embodiment.

As illustrated in FIG. 8, the control method 2 comprises an initial step E0), illustrated F0(10a, p2, 10b, p2), in which the two sets 10a, 10b of flaps 100 are initially positioned in the closed position p2. When the upper route 10a and the lower route 10b are initially in the closed position p2, the spring 12 is stretched upward by the primary connecting part 101a. It is thus tensioned from above. Furthermore, the primary lost motion cam 131a of the upper lever 13a is positioned at −90° as well as the secondary lost motion cam 131b of the lower lever 13b. The primary drive finger 102a of the upper route 10a is in abutment in the primary lost motion cam 131a. The secondary drive finger 102b of the lower route 10b is in abutment in the secondary lost motion cam 131b.

As illustrated in FIG. 8, in step E1), illustrated F1(10a, p1, 10b, p2), one 10a of the sets 10a, 10b of flaps 100 is positioned in the open position p1 before the other 10b of the sets of flaps 100. In the nonlimiting example illustrated, it is the upper route 10a which is positioned in the open position p1.

The actuator 11 which is connected to the lower lever 13b rotates the secondary lost motion cam 131b of the lower lever 13b in the counterclockwise direction. It thus passes from the position −90° to 0°. The secondary lost motion cam 131b slides along the secondary drive finger 102b of the secondary connecting part 101b. The secondary connecting part 101b does not move. The lower route 10b whose flaps 100 are connected by the secondary connecting part 101*b* does not change position. The flaps 100 of the lower route 10*b* remain closed.

The lower lever 13*b* which is also connected to the connecting rod 14 when it starts moving drives said connecting rod 14; it pushes it upward. The latter performs a circular stroke and rises. The connecting rod 14 which is also connected to the upper lever 13*a* drives said upper lever 13*a* and rotates the primary lost motion cam 131*a* of the latter in the counterclockwise direction. It thus passes from the position −90° to 0°. The primary lost motion cam 131*a* releases the primary drive finger 102*a* from the primary connecting part 101*a*. The spring 12 which is connected to the primary connecting part 101*a* relaxes, and the primary connecting part 101*a* descends downward. The flaps 100 of the upper route 10*a* open.

Thus, the flaps 100 of the upper route 10*a* are opened, and the flaps 100 of the lower route 10*b* remain closed. This is a configuration with one part of the flaps 100 of the system 1 of controlled flaps open and with another part of the flaps 100 closed.

As illustrated in FIG. 8, in step E2), illustrated F2(10*a*, p1, 10*b*, p1), the other 10*b* of the sets 10*a*, 10*b* of flaps 100 is positioned in the open position p1. In the nonlimiting example illustrated, it is the lower route 10*b* which is positioned this time also in the open position p1.

The actuator 11 which is connected to the lower lever 13*b* again rotates the secondary lost motion cam 131*b* of the lower lever 13*b* in the counterclockwise direction. The secondary lost motion cam 131*b* thus passes from the 0° position to +90°. It has thus again performed a −90° rotation. The secondary drive finger 102*b* of the lower route 10*b* which is in abutment on the secondary lost motion cam 131*b* of the lower lever 13*b* drives the secondary connecting part 101*b* downward due to the rotation of the secondary lost motion cam 131*b*. The spring 12 which is connected to the secondary connecting part 101*b* is stretched downward by the secondary connecting part 101*b*. It is thus tensioned from below. The flaps 100 of the lower route 10*b* open.

The lower lever 13*b* which is also connected to the connecting rod 14 when it starts moving drives said connecting rod 14; it still pushes it upward. The latter continues its circular stroke and continues to rise. The connecting rod 14, which is also connected to the upper lever 13*a*, drives said upper lever 13*a* and rotates the primary lost motion cam 131*a* of the latter in the counterclockwise direction. The primary lost motion cam 131*a* thus passes from the −0° position to +90°. It has thus again performed a −90° rotation. The primary lost motion cam 131*a* slides along the primary drive finger 102*a* of the primary connecting part 101*a*. The primary connecting part 101*a* does not move. The upper route 10*a* whose flaps 100 are connected by the primary connecting part 101*a* does not change position. The flaps 100 of the upper route 10*a* remain open.

Thus, the flaps 100 of the lower route 10*b* open, and flaps 100 of the upper route 10*a* remain open. This is a configuration with all the flaps 100 of the system 1 of controlled flaps open.

It will be noted that to pass from the initial step to step E2, the primary lost motion cam 102*a* and the secondary lost motion cam 102*b* have performed a rotation of −180° (in the counterclockwise direction).

It will be noted that to drive both sets 10*a*, 10*b* of flaps 100 into the open position p1, said control method 2 executes the step of driving one 10*a* of the sets 10*a*, 10*b* of flaps 100 into the open position p1 before the other 10*b* of the sets 10*a*, 10*b* of flaps 100. Thus, to pass from phase a in FIG. 7 to phase c in FIG. 7, it is necessary to pass through phase b in FIG. 7.

Furthermore, to drive both sets 10*a*, 10*b* of flaps 100 again into the closed position p2, in one nonlimiting embodiment illustrated in FIG. 9, said control method 2 executes the step of driving the other 10*b* of the sets 10*a*, 10*b* of flaps 100 into the closed position p2 before one 10*a* of the sets 10*a*, 10*b* of flaps 100. Thus, to pass from phase c in FIG. 7 to phase a in FIG. 7, it is necessary to pass through phase b in FIG. 7. In this case, as illustrated in FIG. 9, the control method 2 further comprises:

a step E3), illustrated F3(10*a*, p1, 10*b*, p2), of driving the other 10*b* of the sets 10*a*, 10*b* into the closed position p2. In the nonlimiting example illustrated, it is the set 10*a* that it positions in the closed position p2, and a step E4), illustrated F4(10*a*, p2, 10*b*, p2), of driving one 10*a* of the sets 10*a*, 10*b* into the closed position p2. In the nonlimiting example illustrated, it is the set 10*b* that it subsequently positions in the closed position p2.

Of course, the description of the invention is not limited to the embodiments described above and to the field described above. Thus, in another nonlimiting embodiment, the axis of rotation Ax1 of the actuator 11 is located in a plane different from that Ax1 of the lower lever 13*b* and from that Ax3 of each flap of the set 10*b*. Thus, in another nonlimiting embodiment, the axis of rotation Ax4 of the upper lever 13*a* is located in a plane different from that Ax5 of each flap of the set 10*a*.

Thus, the described invention has in particular the following advantages:

it makes it possible to have a flexible flap control strategy, it makes it possible to have two sets 10*a*, 10*b* of flaps 100 controlled with a single actuator 11, it makes it possible to open or close only all or part of the flaps 100.

The invention claimed is:

1. A system of controlled flaps for a vehicle, comprising:

two sets of flaps, each set of flaps being able to assume an open position and a closed position; and an actuator configured to drive one of the sets of flaps into the open position before the other of the sets of flaps;

a spring connecting the two sets of flaps;

an upper lever with a primary lost motion cam configured to be driven by a connecting rod disposed opposite to the spring and that rotates the upper lever and the primary lost motion cam;

a lower lever with a secondary lost motion cam configured to be driven by the actuator; and the connecting rod connected to the actuator and connecting the upper lever and the lower lever;

wherein the upper lever and the lower lever each attach to both sets of flaps on a first side of the flaps opposite from a second side of the flaps to which the spring attaches;

wherein the spring comprises a first end connected to a primary connecting part on a surface of one of the sets of flaps and a second end connected to a secondary connecting part on a surface of the other of the sets of flaps.

2. The system of controlled flaps as claimed in claim 1, wherein the spring is configured to:

be tensioned when the two sets of flaps are in the closed position, relax so as to position in the open position one of the sets of flaps, be tensioned when the two sets of flaps are in the open position.

3. The system of controlled flaps as claimed in claim 1, wherein the two sets of flaps are initially in the closed position.

4. The system of controlled flaps as claimed in claim 1, wherein one of the sets of flaps extends in a different plane from the other of the sets of flaps or the two sets of flaps are coplanar.

5. The system of controlled flaps as claimed in claim 1, further comprising:

a primary connecting part connecting the flaps of one of the sets of flaps and comprising at least one primary drive finger which comes into abutment in the primary lost motion cam when one of the sets of flaps is in the open position or in the closed position, a secondary connecting part connecting the flaps of the other of the sets of flaps and comprising at least one secondary drive finger which comes into abutment in the secondary lost motion cam when the other of the sets of flaps is in the open position or in the closed position, and which slides along the secondary lost motion cam when one of the sets is in the open position.

6. The system of controlled flaps as claimed in claim 1, wherein one set of flaps is fully open while the other set of flaps remains fully closed in a sequential opening of the two sets of flaps.

7. The system of controlled flaps as claimed in claim 1, wherein the connecting rod is movable separate from the spring at each end of two ends of the connecting rod.

8. A method for controlling flaps of a vehicle, the flaps forming part of two sets of flaps, each set of flaps being able to assume an open position and a closed position, wherein the control method comprises:

driving one of the sets of flaps into the open position before the other of the sets of flaps;

wherein the two sets of flaps are connected by a spring;

wherein driving one of the sets of flaps comprises using an actuator to drive a connecting rod disposed opposite to the spring;

wherein an upper lever and a lower lever each attach to both sets of flaps on a first side of the flaps opposite from a second side of the flaps to which the spring attaches;

wherein the spring comprises a first end connected to a primary connecting part on a surface of one of the sets of flaps and a second end connected to a secondary connecting part on a surface of the other of the sets of flaps.

9. The control method as claimed in claim 8, wherein the two sets of flaps are initially in the closed position.

10. The control method as claimed in claim 8, wherein, to drive the two sets of flaps into the closed position, the control method further comprises: driving the other of the sets of flaps into the closed position before one of the sets of flaps.

11. The control method as claimed in claim 8, wherein the connecting rod is movable separate from the spring at each end of two ends of the connecting rod.

* * * * *